(12) United States Patent
Tsuchida et al.

(10) Patent No.: US 11,290,265 B2
(45) Date of Patent: Mar. 29, 2022

(54) SERVER DEVICE, SECRET EQUALITY DETERMINATION SYSTEM, SECRET EQUALITY DETERMINATION METHOD AND SECRET EQUALITY DETERMINATION PROGRAM RECORDING MEDIUM

(71) Applicant: NEC Corporation, Tokyo (JP)

(72) Inventors: Hikaru Tsuchida, Tokyo (JP); Toshinori Araki, Tokyo (JP); Kazuma Ohara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 120 days.

(21) Appl. No.: 16/769,697

(22) PCT Filed: Dec. 5, 2017

(86) PCT No.: PCT/JP2017/043629
§ 371 (c)(1),
(2) Date: Jun. 4, 2020

(87) PCT Pub. No.: WO2019/111318
PCT Pub. Date: Jun. 13, 2019

(65) Prior Publication Data
US 2020/0374107 A1    Nov. 26, 2020

(51) Int. Cl.
*H04L 9/08* (2006.01)
*H04L 29/06* (2006.01)

(52) U.S. Cl.
CPC ............ *H04L 9/085* (2013.01); *H04L 9/0869* (2013.01); *H04L 63/0428* (2013.01)

(58) Field of Classification Search
CPC ... H04L 9/085; H04L 9/0869; H04L 63/0428; H04L 9/0894; H04L 63/04;
(Continued)

(56) References Cited

U.S. PATENT DOCUMENTS

2015/0180902 A1   6/2015  Biswas et al.
2016/0335440 A1*  11/2016  Clark ...................... H04L 9/085
(Continued)

OTHER PUBLICATIONS

Adi Shamir, "How to Share a Secret", Communications of the ACM, Nov. 1979, pp. 612-613, vol. 22, No. 11.
(Continued)

*Primary Examiner* — Jacob Lipman
(74) *Attorney, Agent, or Firm* — Sughrue Mion, PLLC (57) ABSTRACT

A server device, a secret equality determination system, a secret equality determination method and a secret equality determination program recording medium are provided which, regardless of the server sharing scheme, can run with no difference in the number of communication rounds, whether carried out with a ring of order 2 or with a ring of an order greater than 2. This server device is provided with a secret shared data generation unit, a data storage unit, a mask unit, a random number share bit-conjunction unit, a random number share generation unit, a determination bit-conjunction unit and a secret shared data restoration unit. The secret shared data generation unit generates secret shared data. The data storage unit stores the secret shared data. The mask unit uses random number secret shared data to mask certain shared data. The random number share generation unit generates random number shares in which random numbers are secretly shared. In parallel with other calculations, the random number share bit-conjunction unit calculates the logical product of the values in which the random numbers are secretly shared. The determination bit-conjunction unit performs a secret equality determination using the value outputted by the random number share bit-conjunction unit.

4 Claims, 8 Drawing Sheets

(58) Field of Classification Search
CPC ... H04L 2209/46; H04L 63/10; G06F 21/606; G06F 21/6218; G06F 7/588; G09C 1/00
USPC .......................................................... 713/153
See application file for complete search history.

(56) References Cited

U.S. PATENT DOCUMENTS

2019/0205568 A1* 7/2019 Veugen .................... G06F 7/723
2021/0273798 A1* 9/2021 Li ........................... G06F 21/71

OTHER PUBLICATIONS

Dan Bogdanov, et al., "High-performance secure multi-party computation for data mining applications", International Journal of Information Security, Sep. 9, 2012, pp. 403-418, vol. 11, No. 6.

Takashi Nishide, et al., "Multiparty Computation for Interval, Equality, and Comparison Without Bit-Decomposition Protocol", Public Key Cryptography-PKC 2007, LNCS vol. 4450, [online], 2007, pp. 343-360, [retrieved on Mar. 5, 2018], retrieved from the Internet <URL: http://doi.org/10.1007/978-3-540-71677-8_23>.

Andrew C. Yao, "Protocols for Secure Computations", In Proceedings of the 21st Annual IEEE Symposium on the Foundations of Computer Science, 1982, pp. 160-164.

Toshinori Araki, et al., "High-Throughput Semi-Honest Secure Three-Party Computation with an Honest Majority", In proceedings of the 2016 ACM SIGSAC Conference on Computer and Communications Security, Oct. 24-28, 2016, pp. 805-817, Vienna, Austria.

Ivan Damgard, et al., Unconditionally Secure Constant-Rounds Multi-party Computation for Equality, Comparison, Bits and Exponentiation, Theory of Cryptography (TCC 2006), LNCS, 2006, pp. 285-304, vol. 3876, [retrieved on Mar. 5, 2018], retrieved from the Internet <URL http://doi.org/10.1007/11681878_15>.

International Search Report for PCT/JP2017/043629 dated Mar. 13, 2018 (PCT/ISA/210).

Written Opinion for PCT/JP2017/043629 dated Mar. 13, 2018 (PCT/ISA/237).

* cited by examiner

SERVER DEVICE, SECRET EQUALITY DETERMINATION SYSTEM, SECRET EQUALITY DETERMINATION METHOD AND SECRET EQUALITY DETERMINATION PROGRAM RECORDING MEDIUM

CROSS REFERENCE TO RELATED APPLICATIONS

This application is a National Stage of International Application No. PCT/JP2017/043629 filed Dec. 5, 2017, the disclosure of which is incorporated herein in its entirety by reference.

TECHNICAL FIELD

This invention relates to a secure computation protocol and, more particularly, to a server device, a secret equality determination system, a secret equality determination method, and a secret equality determination program recording medium, which are capable of efficiently performing a secret equality determination.

BACKGROUND ART

A secure computation protocol is a technique which can obtain a computed result alone while an input of each participant of the protocol and values in computation processes are concealed. As the secure computation protocol, general methods, which can execute any computation with logic circuits and arithmetic circuits used as bases, are proposed.

In a case of executing any computation by the secure computation protocol, a communication cost is incurred. The communication cost is evaluated by two evaluation axes of the number of communication rounds and communication traffic. Herein, the number of communication rounds is the number of times of communications which occur among the respective participants of the secure computation protocol when certain computation processing is executed by the secure computation protocol. In this event, it is assumed, for example, that three participants of the secure computation protocol are represented by P1, P2, and P3. It is assumed that, on executing certain computation processing by the secure computation protocol, one communication occurs between P1 and P2, one communication occurs between P2 and P3, and one communication occurs between P3 and P1. In this event, it is noted that the number of communication rounds is counted as one round if these communications can be concurrently carried out. In addition, the communication traffic is an amount of communication data which are generated among the respective participants of the secure computation protocol when certain computation processing is executed by the secure computation protocol.

Various secure search techniques which allow secured data to be searched while being kept secret have been proposed from the past.

As one technique for achieving secure search, a Multi-Party Computation (MPC) technique is known (e.g. see Non Patent Literature 1).

In the MPC, two or more servers, each holding a piece of secret information, cooperatively execute computation so as to compute values of any function supplied with the secret information without revealing their respective pieces of secret information. The secure search by means of the MPC may be realized as follows. First, data to be deposited are shared and held in the above-mentioned two or more server devices by means of a secret sharing method (e.g. see Non Patent Literature 1). Then, the above-mentioned function is defined as "a function of returning 1 when data including certain partial data are secretly shared and held in the server devices and of returning 0 otherwise".

As a means of realizing the MPC, there is a means of using a threshold-type secret sharing method of Shamir (Shamir's Secret Sharing: SSS), which is described in Non Patent Literature 1. First, Non Patent Literature 1 will be described.

The threshold-type secret sharing method is a technique of converting the secret information into a plurality of pieces of shared information. The threshold-type secret sharing method has a characteristic that the secret information can be restored by gathering the pieces of converted shared information that are not less in number than a threshold value and the original secret information is not revealed from the pieces of the shared information that are less in number than the threshold value.

The SSS in Non Patent Literature 1 is a method of secretly sharing a number a belonging to a finite field Zp by N server devices, and uses a (k−1)th-order polynomial $f\_a(x)$. In this method, for example, let $f\_a(0)=a$, and each point $f\_a(i)$ on the polynomial is distributed to an i-th server device ($1 \leq i \leq N$). The distributed information $f\_a(i)$ is called shared information of x in the SSS. In this event, it is possible to uniquely restore the (k−1)th-order polynomial $f\_a(x)$ from k points on the polynomial if k server devices cooperate with one another, and then it is possible to calculate $f\_a(0)$ being the secret information.

Pieces of shared information of the secret information a, that are generated on sharing the secret information a by the N server devices using the polynomial $f\_a(x)$ modulo p, are written as $[a]p=(f\_a(1), f\_a(2), \ldots, f\_a(N))$. In this event, it is assumed that $f\_a(i)$ is held in the i-th server device having an identifier i ($1 \leq i \leq N$).

As general methods which can execute any calculation, for example, Non Patent Literature 2, Non Patent Literature 3, Non Patent Literature 4, and Non Patent Literature 5 are cited. Types of methods are roughly classified into a method based on a Garbled Circuit represented by Non Patent Literature 4 and a method based on a secret sharing method such as Non Patent Literature 2, Non Patent Literature 3, and Non Patent Literature 5. It is noted that the secret sharing method is a technique capable of restoring original secret information by distributing a value into a plurality of shared values and gathering the shared values that are not less in number than a threshold value. Herein, the shared values are called secret shared data or shares.

Non Patent Literature 3 discloses a secure computation protocol which can execute computation for a logical circuit, an arithmetic circuit, and a circuit obtained by mixing the both circuits. Different from Non Patent Literature 2, Non Patent Literature 3 uses the secret sharing method of Non Patent Literature 1 and performs computation on a field with a prime number p as an order. Therefore, in Non Patent Literature 3, communication traffic is increased in proportion to a magnitude of the order of the field. Herein, it is noted that, on computing a mixed circuit of the logical circuit and the arithmetic circuit, both of a value in the logical circuit and a value in the arithmetic circuit are values belonging to the field with the prime number p as the order. In addition, in Non Patent Literature 3, it is possible to execute the computation with a constant number of communication rounds regardless of the magnitude of the order. However, a large amount of the communication traffic is required.

Non Patent Literature 4 discloses a secure computation protocol which executes computation based on a logical circuit. A method of Non Patent Literature 4 is a method using a pseudo-random function and an oblivious transfer protocol and can execute computation with a constant number of communication rounds. However, the method of Non Patent Literature 4 requires a large amount of the communication traffic.

Non Patent Literature 2 discloses a secure computation protocol which can execute computation for a logical circuit, an arithmetic circuit, and a circuit obtained by mixing the both circuits. A method of Non Patent Literature 2 is a method based on an additive secret sharing method on a residue ring, in which communication traffic is increased in proportion to a magnitude of the order of the ring. Different from the method of Non Patent Literature 3, the method of Non Patent Literature 2 can perform, on computing the mixed circuit of the logical circuit and the arithmetic circuit, computation on the rings corresponding to their respective values. For example, computation is possible with a value of the logical circuit assumed to be a value belonging to the ring of the order of 2 and a value of the arithmetic circuit assumed to be a value belonging to the ring of the order of $2^{n'}$ (n' is an integer greater than 2). In the method of Non Patent Literature 3, it is necessary to compute values of 0, 1 in the logical circuit also on the field with the prime number p as the order. Therefore, in Non Patent Literature 2, the communication traffic can be kept lower. As compared with the methods of executing computation with a constant number of communication rounds, such as those in Non Patent Literature 3 and Non Patent Literature 4, the same computation processing can be executed with less communication traffic in Non Patent Literature 2. However, in the method of Non Patent Literature 2, the number of communication rounds is increased in proportion to a circuit depth for computation processing.

Herein, the circuit depth for computation processing does not mean the maximum total number of gates required to pass through from an input gate to an output gate but means the maximum total number of AND gates and multiplication gates that are required to pass through from the input gate to the output gate. Hereinafter, the circuit depth means the maximum total number of the AND gates, the multiplication gates, and secret sharing restoration gates that are required to pass through from the input gate to the output gate.

Non Patent Literature 5 discloses a secure computation protocol which can execute computation for a logical circuit, an arithmetic circuit, and a circuit obtained by mixing the both circuits. A method of Non Patent Literature 5 is a method based on a replicated secret sharing method on a residue ring and has communication traffic which is increased in proportion to a magnitude of the order. Herein, like the method of Non Patent Literature 2, the method of Non Patent Literature 5 is different from the method of Non Patent Literature 3 and can perform, on computing the mixed circuit of the logical circuit and the arithmetic circuit, computation on the rings corresponding to their respective values. Therefore, as compared with the method of Non Patent Literature 3, the communication traffic can be kept lower in Non Patent Literature 5. In addition, as compared with methods of executing computation with a constant number of communication rounds, such as those in Non Patent Literature 3 and Non Patent Literature 4, the same computation processing can be executed with less communication traffic in Non Patent Literature 5. However, in the method of Non Patent Literature 5, the number of communication rounds is increased in proportion to a circuit depth for computation processing.

Herein, for example, a secure computation protocol excellent in efficiency in an aspect of the number of communication rounds is an effective method in a communication environment where a network delay is large. On the other hand, a secure computation protocol excellent in efficiency in an aspect of the communication traffic is an effective method in a communication environment where a communication band is narrow. In the secure computation protocols, computation may be performed using a plurality of server devices on a cloud. However, the respective server devices may operate in different cloud environments and an increase in network delay is supposed. Thus, especially, it is important to propose the secure computation protocol excellent in efficiency with respect to the number of communication rounds.

In this event, it is necessary not only to propose a method excellent in efficiency with respect to basic binary operations, such as an exclusive OR, an AND, addition, and multiplication, but also to propose a method excellent in efficiency with respect to an upper computation protocol. This is because, in a case of configuring a specific function using a general method which can execute any computation, a method of executing the specific function with an optimal configuration is nonobvious. As the upper computation protocol, for example, secret equality determination is exemplified. Herein, the secret equality determination is processing which comprises taking, as arguments, elements a and b on a secure ring; returning a value obtained by securing 1, which is an element on the ring of the order of 2, if a and b agree with each other; and returning a value obtained by securing 0, which is an element on the ring of the order of 2, in case of disagreement. The secret equality determination is frequently used in character string processing such as partial agreement determination and distance calculation in the secure computation protocol.

Herein, the number of communication rounds by the secret equality determination of Non Patent Literature 2 is equal to (Log (L)+1). Herein, a base of Log is 2 and L is a bit length of the order of the ring. In Non Patent Literature 2, if computation is performed on whether or not share strings of secret sharing on the ring of the order of 2 agree with each other, the number of communication rounds is equal to Log (L). That is, when the shares of the secret sharing on the ring of the order greater than 2 are taken as the arguments, a loss of one occurs in the number of communication rounds in the secret equality determination.

CITATION LIST

Non Patent Literature(s)

NPL 1: Adi Shamir, "How to Share a Secret," Commun. ACM 22(11), pp. 612-613, 1979.

NPL 2: Dan Bogdanov, Margus Niitsoo, Tomas Toft, Jan Willemson, "High-performance secure multi-party computation for data mining applications," International Journal of Information Security, 11(6), 403-418.

NPL 3: Takashi Nishide, Kazuo Ohta, "Multiparty Computation for Interval, Equality, and Comparison without Bit-Decomposition Protocol," In PKC2007, LNCS, vol. 4450, [online], 2007, pp. 343-360, [retrieved on 5 Mar. 2018], retrieved from the Internet <URL: http://doi.org/10.1007/978-3-540-71677-8_23>

NPL 4: Andrew C, Yao, "Protocols for secure computations," In Proceedings of the 21st Annual IEEE Symposium on the Foundations of Computer Science, pp. 160-164, 1982.

NPL 5: Toshinori Araki, Jun Furukawa, Yehuda Lindell, Ariel Nof, Kazuma Ohara, "High-Throughput Semi-Honest Secure Three-party Computation with an Honest Majority", In Proceedings of the 2016 ACM SIGSAC Conference on Computer and Communications Security, pp. 805-817, ACM.

SUMMARY OF INVENTION

Technical Problem

As described above, in Non Patent Literature 2, a difference occurs in the number of communication rounds between a case where the secret equality determination is carried out on the ring of the order of 2 and a case where the secret equality determination is carried out on the ring of the order greater than 2, and the latter requires a higher cost from the viewpoint of the number of communication rounds. When the number of rounds increases, deterioration of performance may possibly occur in a communication environment where the network delay is large. In particular, in a case of executing, by the secure computation protocol, the character string processing frequently using the equality determination, an increase in number of communication rounds in the secret equality determination may cause deterioration in performance of the computation processing as a whole. On the other hand, in Non Patent Literature 1 and Non Patent Literature 3, there is a problem that, although the number of communication rounds is constant regardless of the magnitude of the order, the communication traffic becomes higher than that in Non Patent Literature 2 based on the additive secret sharing.

It is an object of this invention to provide a server device, a secret equality determination system, a secret equality determination method, and a secret equality determination program recording medium, which can solve the above-mentioned problems and which can execute secret equality determination where the number of communication rounds is small without depending on a secret sharing method.

Solution to Problem

In view of the above-mentioned problems, an aspect of the present invention is a server device, comprising a secret shared data generation unit configured to generate first secret shared data; a data storage unit configured to save the first secret shared data and second secret shared data generated by another server device; a random number share generation unit configured to generate a random number share obtained by secretly sharing a random number and to store the random number share in the data storage unit; a mask unit configured to mask the second secret shared data using the random number share and the first secret shared data which are saved in the data storage unit and to store masked data in the data storage unit; a secret shared data restoration unit configured to transmit the masked data to the another server device and to restore original data from masked data acquired from the another server device to produce restored data; a random number share bit-conjunction unit configured to perform, in parallel with other computations, computation of AND on values obtained by secretly sharing the random number to produce an ANDed value; and a determination bit-conjunction unit configured to perform secret equality determination using the restored data, the random umber share, and the ANDed value.

In addition, another aspect of the present invention is a secret equality determination method comprising the steps of generating first secret shared data; saving, in a data storage unit, the first secret shared data and second secret shared data generated by another server device; generating a random number share obtained by secretly sharing a random number and storing the random number share in the data storage unit; masking the second secret shared data using the random number share and the first secret shared data which are saved in the data storage unit and storing masked data in the data storage unit; transmitting the masked data to the another server device and restoring original data from masked data acquired from the another server device to produce restored data; performing, in parallel with other computations, computation of AND on values obtained by secretly sharing the random number to produce an ANDed value; and performing secret equality determination using the restored data, the random number share, and the ANDed value.

Furthermore, a different aspect of the present invention is a recording medium storing a secret equality determination program which causes a computer to execute a process of generating first secret shared data; a process of saving, in a data storage unit, the first secret shared data and second secret shared data generated by another server device; a process of generating a random number share obtained by secretly sharing a random number and storing the random number share in the data storage unit; a process of masking the second secret shared data using the random number share and the first secret shared data which are saved in the data storage unit and storing masked data in the data storage unit a process of transmitting the masked data to the another server device and restoring original data from masked data acquired from the another server device to produce restored data; a process of performing, in parallel with other computation, computation of AND on values obtained by secretly sharing the random number to produce an ANDed value; and a process of performing secret equality determination using the restored data, the random number share, and the ANDed value.

Advantageous Effect of Invention

According to the present invention, it is possible to execute secret equality determination, in which computed values, a determined result, and values in computation processes cannot be known, without causing a difference in number of communication rounds as a whole between a case when the secret equality determination is carried out on a ring of the order of 2 and a case when the secret equality determination is carried out on a ring of the order greater than 2. In addition, the present invention is not dependent on a secret sharing method and, therefore, it is possible to improve an efficiency by improving constituent elements. For instance, when the present invention is embodied by Non Patent Literature 5, it is possible to execute the secret equality determination with small communication traffic as compared with a case of embodying the present invention by Non Patent Literature 2.

Further advantages of the present invention and example embodiments thereof will be explained in detail in the following using description and drawings.

DESCRIPTION OF EMBODIMENTS

Now, example embodiments of the present invention will be described with reference to the drawings. However, a technical scope of the present invention is never restrictedly interpreted by the example embodiments which will be described in the following.

First Example Embodiment

Figure 1:
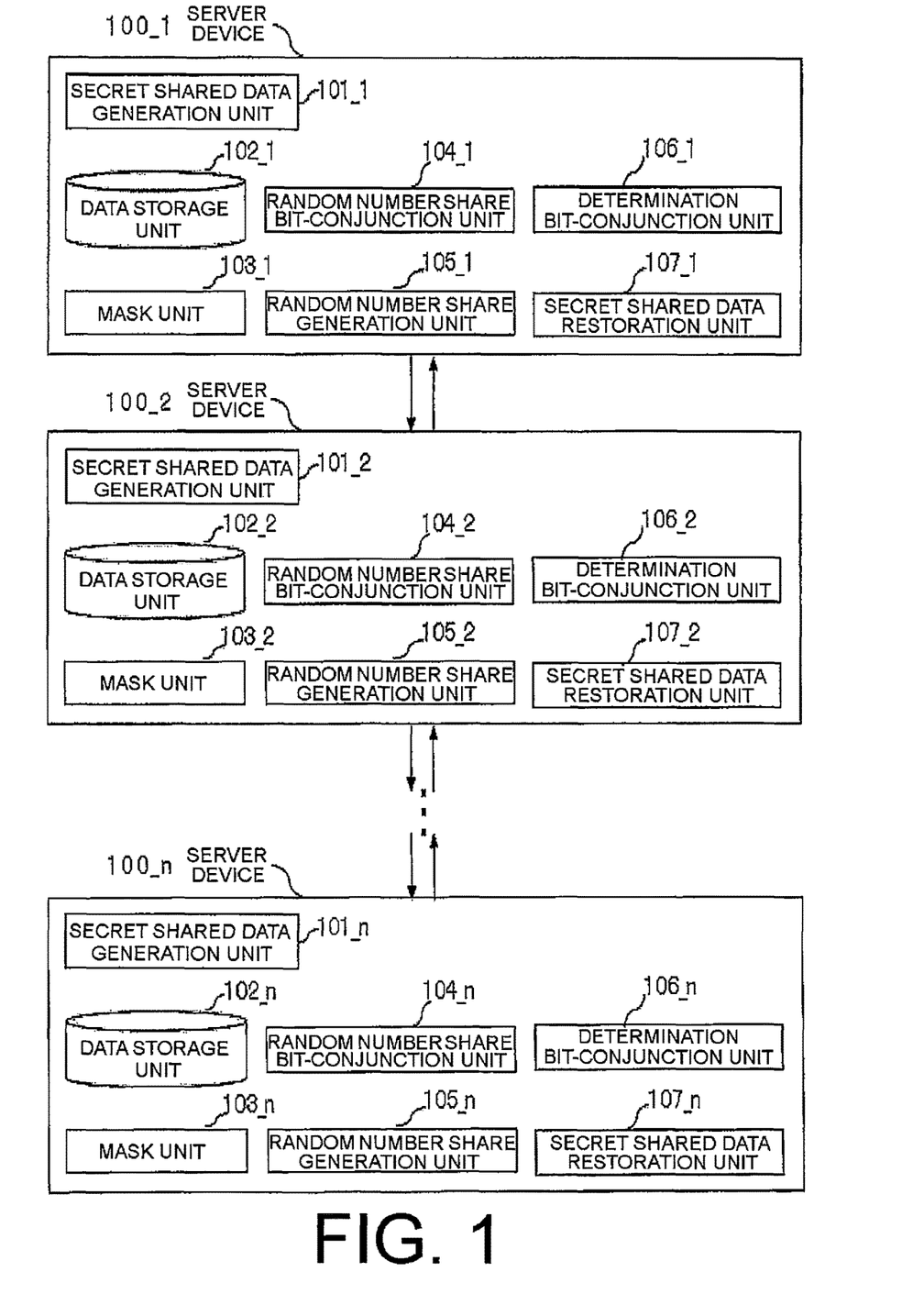
FIG. 1 is a block diagram for illustrating an example of a functional configuration of a secret equality determination system according to a first example embodiment of the present invention.
Figure 2:
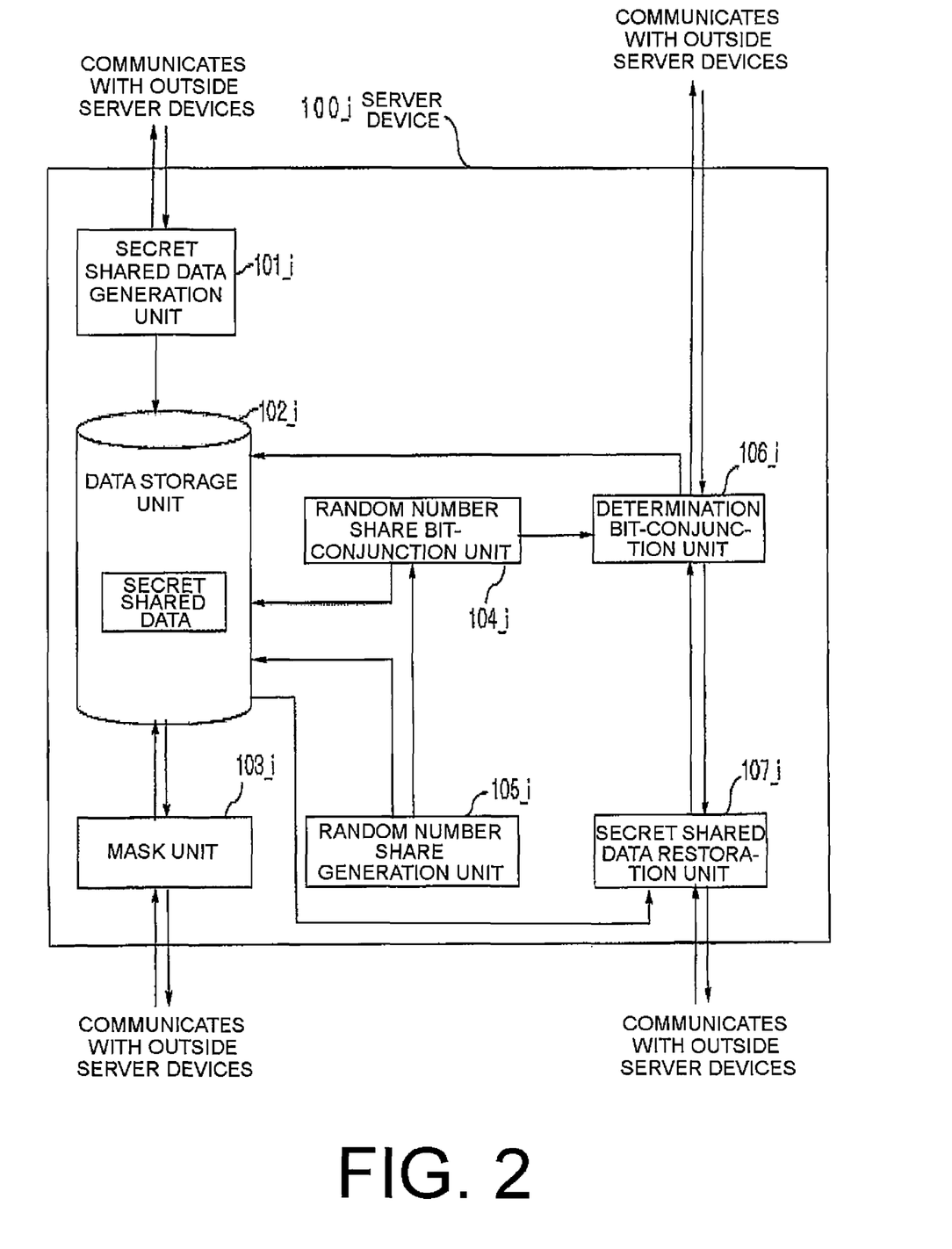
FIG. 2 is a block diagram for illustrating a functional configuration of a server device according to the first example embodiment of the present invention.
Figure 3:
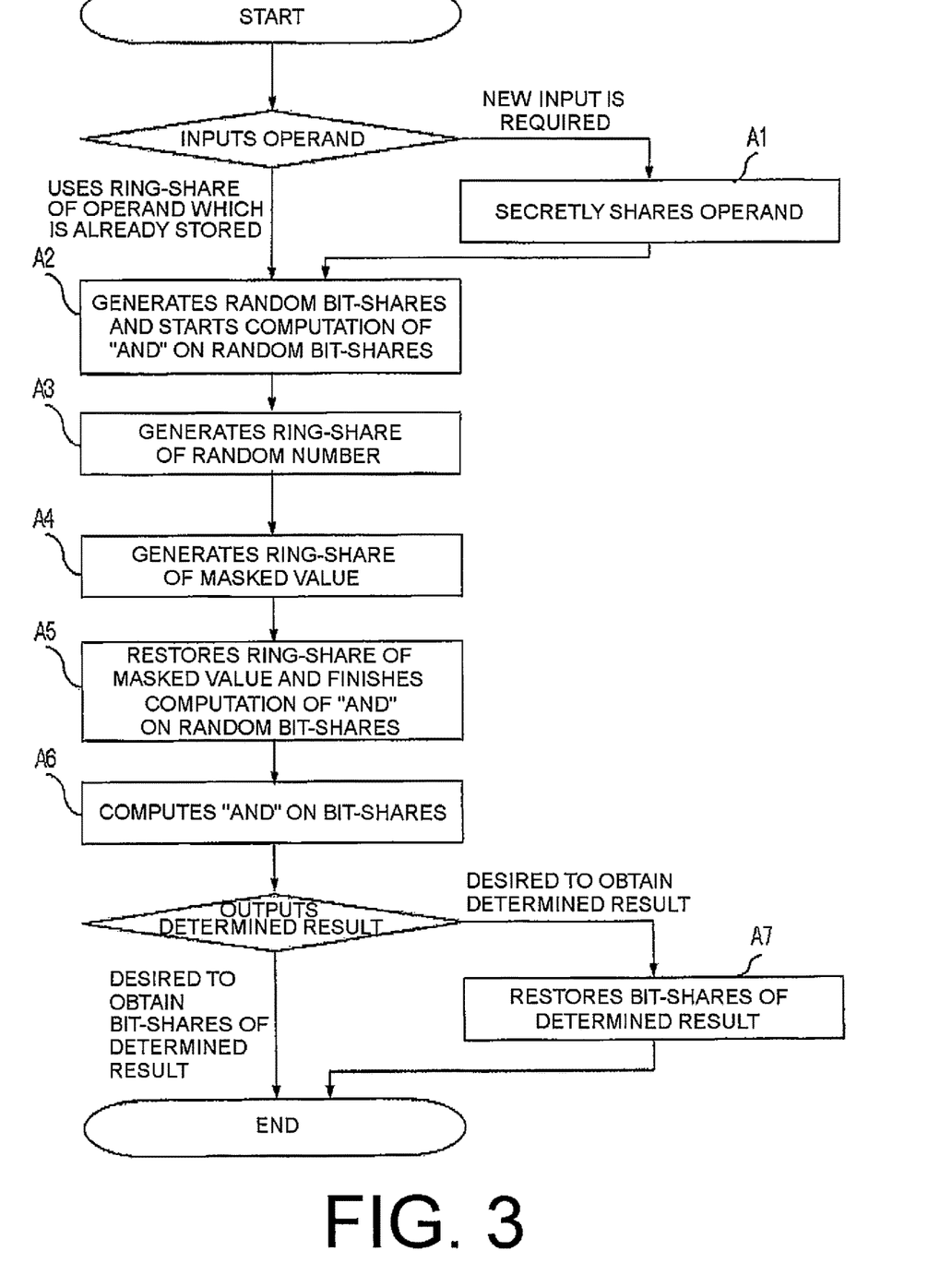
FIG. 3 is a flow chart for illustrating an example of operation of the server device according to the first example embodiment of the present invention.

Referring to FIGS. 1 to 3, description will proceed to a secret equality determination system according to a first example embodiment of the present invention.

FIG. 1 is a block diagram for illustrating an example of a functional configuration of the secret equality determination system according to the first example embodiment of the present invention.

Referring to FIG. 1, the secret equality determination system according to the first example embodiment of the present invention comprises first through n-th (n is an integer which is not less than two) server devices $100\_1$, $100\_2$, ..., $100\_n$ which will be referred to in FIG. 2 described later. In the secret equality determination system according the first example embodiment, each of the first through the n-th server devices $100\_1$ to $100\_n$ is communicably connected via a network to those server devices which are different from itself. FIG. 2 is a block diagram for illustrating an example of a functional configuration of an i-th server device $100\_i$ ($1 \le i \le n$).

As shown in FIG. 2, the i-th server device $100\_i$ comprises an i-th secret shared data generation unit $101\_i$, an i-th data storage unit $102\_i$, an i-th mask unit $103\_i$, an i-th random number share bit-conjunction unit $104\_i$, an i-th random number share generation unit $105\_i$, an i-th determination bit-conjunction unit $106\_i$, and an i-th secret shared data restoration unit $107\_i$. The i-th secret shared data generation unit $101\_i$, the i-th mask unit $103\_i$, the i-th determination bit-conjunction unit $106\_i$, and the i-th secret shared data restoration unit $107\_i$ are communicably connected, via the network, to the server devices which are different from the server device including themselves, respectively. The i-th data storage unit $102\_i$ is connected to the i-th secret shared data generation unit $101\_i$, the i-th mask unit $103\_i$, the i-th random number share bit-conjunction unit $104\_i$, the i-th random number share generation unit $105\_i$, the i-th determination bit-conduction unit $106\_i$, and the i-th secret shared data restoration unit $107\_i$, respectively. The i-th random number share bit-conjunction unit $104\_i$ is connected to the i-th random number share generation unit $105\_i$ and the i-th determination bit-conjunction unit $106\_i$, respectively. The i-th determination bit-conjunction unit $106\_i$ and the i-th secret shared data restoration unit $107\_i$ are connected to each other.

In the secret equality determination system of such a configuration, for either values a and b supplied to any device in the first through the n-th server devices $100\_i$ to $100\_n$ or secret shared data $[a]\_R$ and $[b]\_R$ stored in the first through the n-th data storage units $102\_1$ to $102\_n$, secret shared data of determined results indicative of whether or not a=b holds are computed without allowing the values a and b to be known from the input thereof and from values in computation processes, and are stored in the first through the n-th storage units $102\_1$ to $102\_n$, respectively. After being stored in the first through the n-th data storage units $102\_1$ to $102\_n$, the above-mentioned secret shared data of the determined results may be delivered to the first through the n-th secret shared data restoration units $107\_1$ to $107\_n$, respectively, to obtain restored results.

Now, operation of the secret equality determination system and the i-th server device $100\_i$ according to the first example embodiment of the present invention will be described in detail. FIG. 3 is a flow chart for illustrating an example of operation of the i-th server device $100\_i$.

Herein, $[a]\_B$ means secret shared data of the value a on a ring of the order of 2. $[a]\_R$ means secret shared data of the value b on a ring of the order greater than 2. Hereinafter, $[a]\_B$ is called bit-shares of a whereas $[b]\_R$ is called a ring-share of b. Specifically, shares of the i-th server device $100\_i$ are represented by $[a]\_{Bi}$ and $[b]\_{Ri}$.

For instance, it is assumed that the number of the server devices is equal to three, namely, n=3. In this event, the secret sharing used in Non Patent Literature 2 and Non Patent Literature 5 is cited as examples. Herein, it is assumed that:

$$\oplus, \cdot \qquad \text{[Math.1]}$$

are an exclusive OR and an AND related to the bit-shares, respectively. It is noted that, hereinafter, they are also used as symbols of the exclusive OR and the AND as binary operators for elements on the ring of the order of 2. Herein, the following characteristics hold for the exclusive OR and the AND related to the bit-shares.

$$[a]\_B \oplus [b]\_B = [a \oplus b]\_B$$

$$[a]\_B \oplus c = [a \oplus c]\_B$$

$$[a]\_B \cdot [b]\_B = [a \cdot b]\_B$$

$$[a]\_B \cdot c = [a \cdot c]\_B \qquad \text{[Math. 2]}$$

Furthermore, it is assumed that + and − are an addition operator and a subtraction operator related to the ring-share, respectively. It is noted that, hereinafter, they are also used as the addition operator and the subtraction operator as binary operators for elements on the ring of the order greater than 2. Herein, the following characteristics hold for the addition operator and the subtraction operator related to the ring-share.

$$[a]\_R+[b]\_R=[a+b]\_R$$

$$[a]\_R-[b]\_R=[a-b]\_R \qquad \text{[Math. 3]}$$

For instance, it is assumed that the number of the server devices is equal to three, namely, n=3. In this event, in Non Patent Literature 5, the exclusive OR related to the bit-shares can be computed without requiring communication. In addition, in Non Patent Literature 5, the AND related to the bit-shares can be computed with a communication cost of three bits per one round.

In addition, it is assumed that each of a and b has a bit length of L on determining whether or not a=b holds. That is, the ring-share has the bit length of L. Furthermore, as a result of the secret equality determination, [1]_B is produced if the equality holds and [0]_B is produced if it does not hold.

(Step A1)

As an operation of the i-th server device 100_i, first, an input device which is not shown in the figure delivers an input a to the i-th secret shared data generation unit 101_i. The i-th secret shared data generation unit 101_i generates [a]_R. The i-th server device 100_i saves [a]_Ri in the i-th data storage unit 102_i. The i-th server device 100_i delivers [a]_Ri' (i'≠i) to an i'-th server device 100_i' and the i'-th server device 100_i' saves [a]_Ri' in an i'-th data storage unit 102_i'. For an input b also, a j-th (j≠i) server device 100_j performs similar processes. The step A1 is a step which takes place only on starting computation. Accordingly, in a case where the secret equality determination is carried out for the ring-share which is produced during processes of the secure computation protocol, the step A1 does not take place.

(Step A2)

Next, the i-th random number share generation unit 105_i generates bit-shares [r_t]_Bi of random numbers r_t (t=0, . . . , L−1) on the ring of the order of 2. The i-th random number share generation unit 105_i saves [r_t]_Bi in the i-th data storage unit 102_i. In addition, the i-th random number share generation unit 105_i delivers [r_t]_Bi to the i-th random number share bit-conjunction unit 104_i. The i-th random number share bit-conjunction unit 104_i performs computation of:

$$\bigwedge_{t=0}^{\ell-1} [r\_t]\_Bi \qquad \text{[Math. 4]}$$

in parallel with computations in steps A3, A4, and A5 which will later be described. A circuit depth for executing the computation of Math. 4 is equal to Log (L). The i-th random number share bit-conjunction unit 104_i does not necessarily compute all of Log (L) stages but performs only a part of the computations which corresponds the circuit depth required for the computations in the steps A3, A4, and A5. In addition, on performing the computation of Math. 4, the i-th random number share bit-conjunction unit 104_i saves, in the i-th data storage unit 102_i, an ANDed value in every one stage generated in the computation processes, respectively. For instance, an ANDed value of a first stage is given by:

$$[r\_t]\_Bi\cdot[r\_(t+1)]\_Bi \qquad \text{[Math. 5]}$$

(Step A3)

Furthermore, the i-th random number share generation unit 105_i converts [r_t]_Bi generated in the step A2 into [r_t]_Ri. After conversion, the i-th random number share generation unit 105_i computes:

$$[r]\_Ri = \sum_{t=0}^{\ell-1} 2^{\wedge}i \cdot [r\_t]\_Ri \qquad \text{[Math. 6]}$$

and saves a random number share [r]_Ri in the i-th data storage unit 102_i.

(Step A4)

The i-th mask unit 103_i fetches secret shared data [a]_Ri, [b]_Ri, and [r]_Ri saved in the i-th data storage unit 102_i, and computes:

$$[a]\_Ri-[b]\_Ri+[r]\_Ri=[a-b+r]\_Ri \qquad \text{[Math. 7]}$$

The i-th mask unit 103_i saves masked data [a−b+r]_Ri in the i-th data storage unit 102_i.

(Step A5)

The i-th secret shared data restoration unit 107_i fetches [a−b+r]_Ri from the i-th data storage unit 102_i and transmits it to the j-th server device 100_j on the outside. Simultaneously, the i-th secret shared data restoration unit 107_i restores, as restored data, a−b+r using [a−b+r]_Rj (j≠i) obtained from the j-th server device 100_j on the outside. The i-th secret shared data restoration unit 107_i delivers a−b+r to the i-th determination bit-conjunction unit 106_i.

(Step A6)

Herein, c_t (t=0, . . . , L−1) represents each bit of c when c=a−b+r. The i-th determination bit-conjunction unit 106_i computes:

$$[res]\_Bi = \bigwedge_{t=0}^{\ell-1} (1 \oplus c_t \oplus [r_t]_{Bi}) \qquad \text{[Math.8]}$$

The circuit depth for executing this computation is equal to Log (L). The i-th determination bit-conjunction unit 106_i fetches, from the i-th data storage unit 102_i, the values generated by the i-th random number share generation unit 105_i and the value generated by the i-th random number share bit-conjunction unit 104_i. In this event, the i-th determination bit-conjunction unit 106_i carries out the computation of [res]_Bi modified in correspondence to the depth of the computation circuits from the step A2 to the step A5. For instance, in a case of a first stage of the computation circuit, the computation of:

[res]_Bi, where $$(1 \oplus c\_t \oplus [r\_t]\_Bi) \cdot (1 \oplus c\_(t+1) \oplus [r\_(t+1)]\_Bi) = (1 \oplus c\_(t+1) \oplus [r\_(t+1)]\_Bi \oplus c\_t \oplus c\_t \cdot c\_(t+1) \oplus c\_t \cdot [r\_(t+1)]\_Bi \oplus [r\_t]\_Bi \oplus [r\_t]\_Bi \cdot c\_(t+1) \oplus [r\_t]\_Bi \cdot [r\_(t+1)]\_Bi) \qquad \text{[Math.9]}$$

is carried out. As regards the remaining stages, the computations are carried out without modification. After the above-mentioned computations are finished, the i-th determination bit-conjunction unit 106_i stores [res]_Bi in the i-th data storage unit 102_i.

(Step A7)

In a case of obtaining a result of equality determination, the i-th secret shared data restoration unit 107_i fetches [res]_Bi from the i-th data storage unit 102_i and transmits it to the j-th server device 100_j on the outside. Simultaneously, the i-th secret shared data restoration unit 107_i restores a determined result indicative of whether or not a=b holds, using [res]_Bj (j≠i) obtained from the j-th server device 100_j on the outside.

The first example embodiment of the present invention described above has effects which will be described in the following.

A first effect is that, among costs required for the secret equality determination, the number of communication rounds is reduced. This is because the i-th random number share bit-conjunction unit 104_i performs the computation of AND on [r_t]_Bi in parallel with the computations in the steps A3, A4, and A5. Therefore, in the step A6, the i-th determination bit-conjunction unit 106_i can carry out the computation of [res]_Bi in a modified state. It is possible to reduce the number of communication rounds in correspondence to the number of stages which are computed in the step A6 in the modified state. Therefore, the number of communication rounds in the steps A3, A4, and A5 is offset. As a result, it is possible to execute the computation without causing a difference in the number of the communication rounds between a case of computation on the ring of the order of 2 and a case of computation on the ring of the order greater than 2. However, this effect is obtained in a case where Log (L) is not less than the total number of communication rounds in the steps A3, A4, and A5. In a case where Log (L) is less than the total number of communication rounds in the steps A3, A4, and A5, the number of communication rounds in the secret equality determination agrees with the total number of communication rounds in the steps A3, A4, and A5. For instance, the first effect is obtained when the total number of communication rounds in the steps A3, A4, and A5 is equal to three and when L is not less than eight.

A second effect is that, among the costs required for the secret equality determination, the communication traffic can be reduced by improving constituent elements. This is because the first example embodiment can be carried out without depending on a mode of the secret sharing. For instance, it is possible to reduce the communication traffic in a case of embodying the first example embodiment using the method of Non Patent Literature 5 as compared with a case of embodying the first example embodiment using the method of Non Patent Literature 2.

Second Example Embodiment

Subsequently, referring to FIGS. 4 to 8, description will proceed to a secret equality determination system according to a second example embodiment of the present invention. The secret equality determination system according to the second example embodiment of the present invention is a modification of the secret equality determination system according to the first example embodiment of the present invention described above. Hereinafter, in the second example embodiment, those parts, which are similar in functions to the parts already described in the first example embodiment, are assigned with the same symbols and description thereof is omitted.

Figure 4:
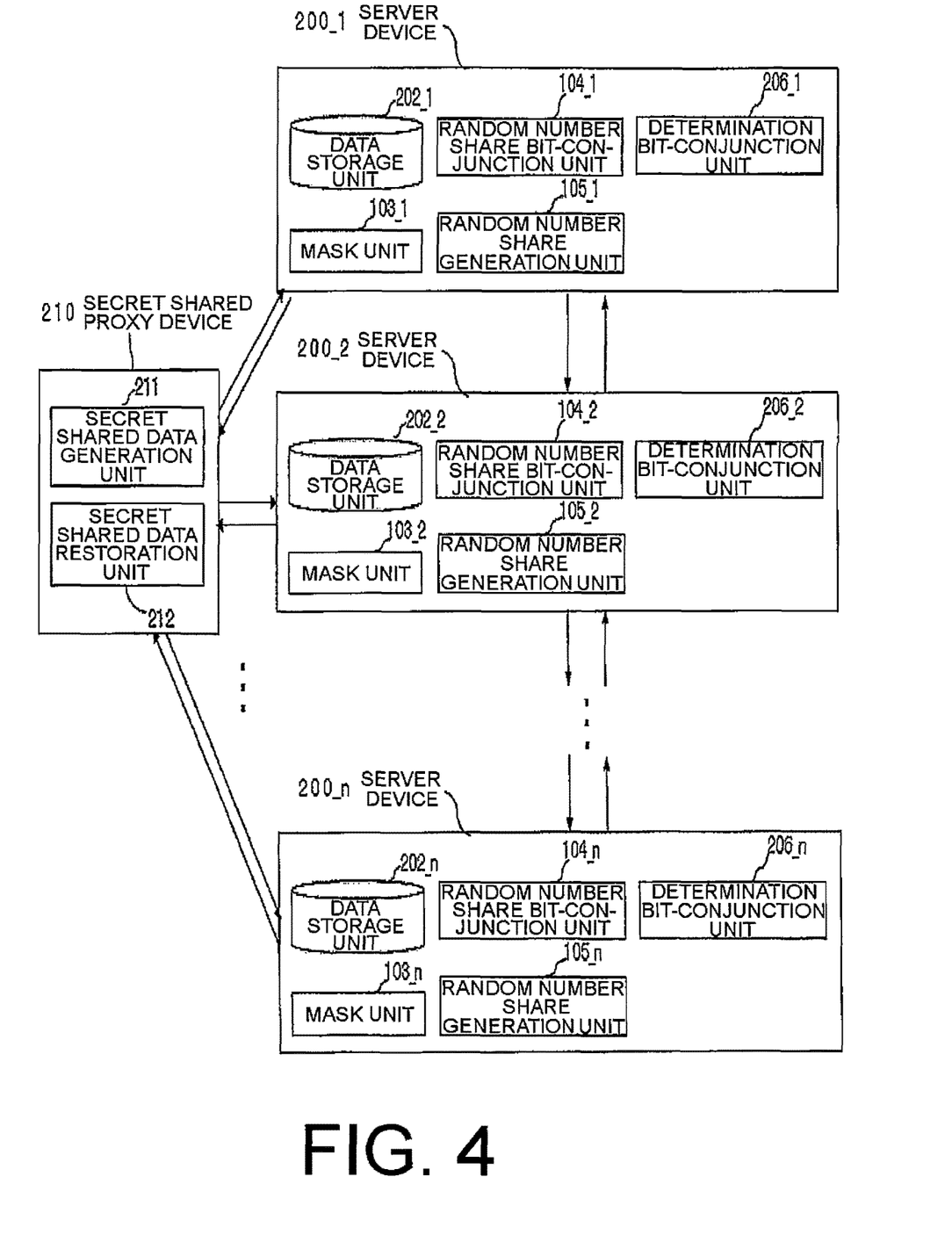
FIG. 4 is a block diagram for illustrating an example of a functional configuration of a secret equality determination system according to a second example embodiment of the present invention.

FIG. 4 is a block diagram for illustrating an example of a functional configuration of the secret equality determination system according to the second example embodiment of the present invention.

Referring to FIG. 4, the secret equality determination system according to the second example embodiment of the present invention comprises a secret shared proxy device 210, which will be referred to in FIG. 5 described later, and first through n-th (n is an integer which is not less than two) server devices 200_1, 200_2, ..., 200_n, which will be referred to in FIG. 6 described later. In the secret equality determination system according to the second example embodiment, the secret shared proxy device 210 and the first through the n-th server devices 200_1 to 200_n are communicably connected via a network. In addition, the first through the n-th server devices 200_1 to 200_n are communicably connected via the network to those server devices which are different from itself.

Figure 5:
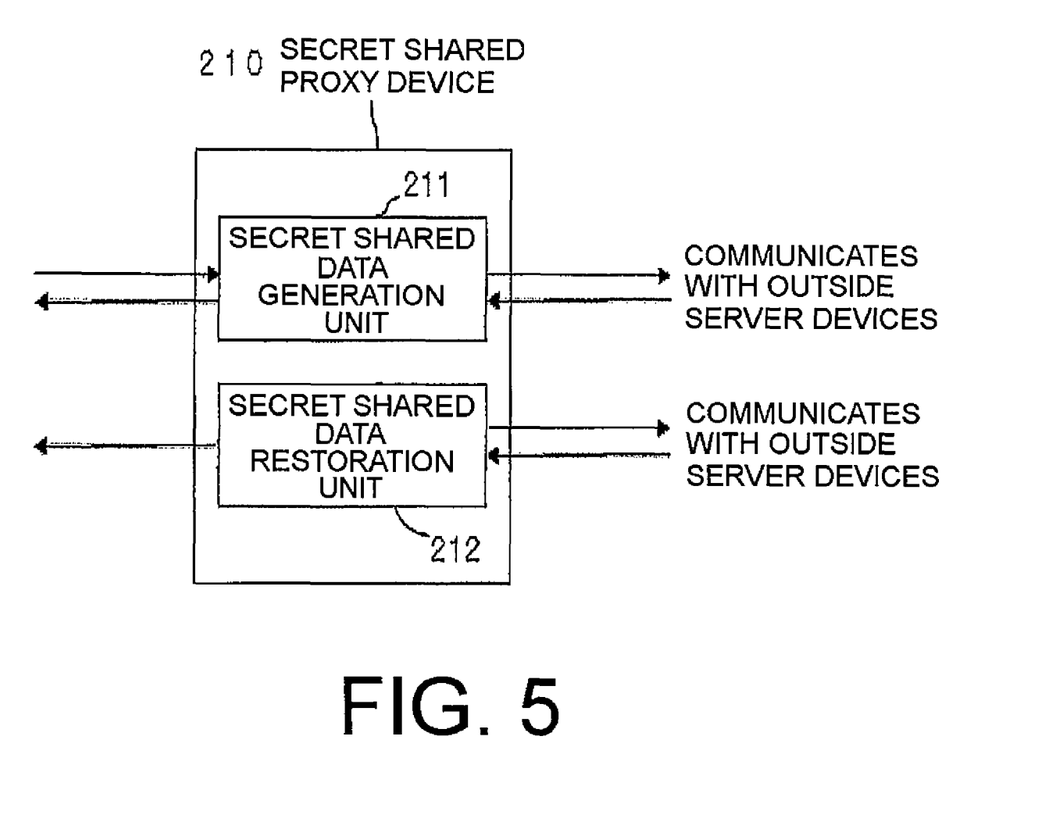
FIG. 5 is a block diagram for illustrating a functional configuration of a secret shared proxy device according to the second example embodiment of the present invention.

As shown in FIG. 5, the secret shared proxy device 210 comprises a secret shared data generation unit 211 and a secret shared data restoration unit 212. The secret shared data generation unit 211 and the first through the n-th server devices 200_1 to 200_n are communicably connected via the network. The secret shared data restoration unit 212 and the first through the n-th server devices 200_1 to 200_n are communicably connected via the network.

Figure 6:
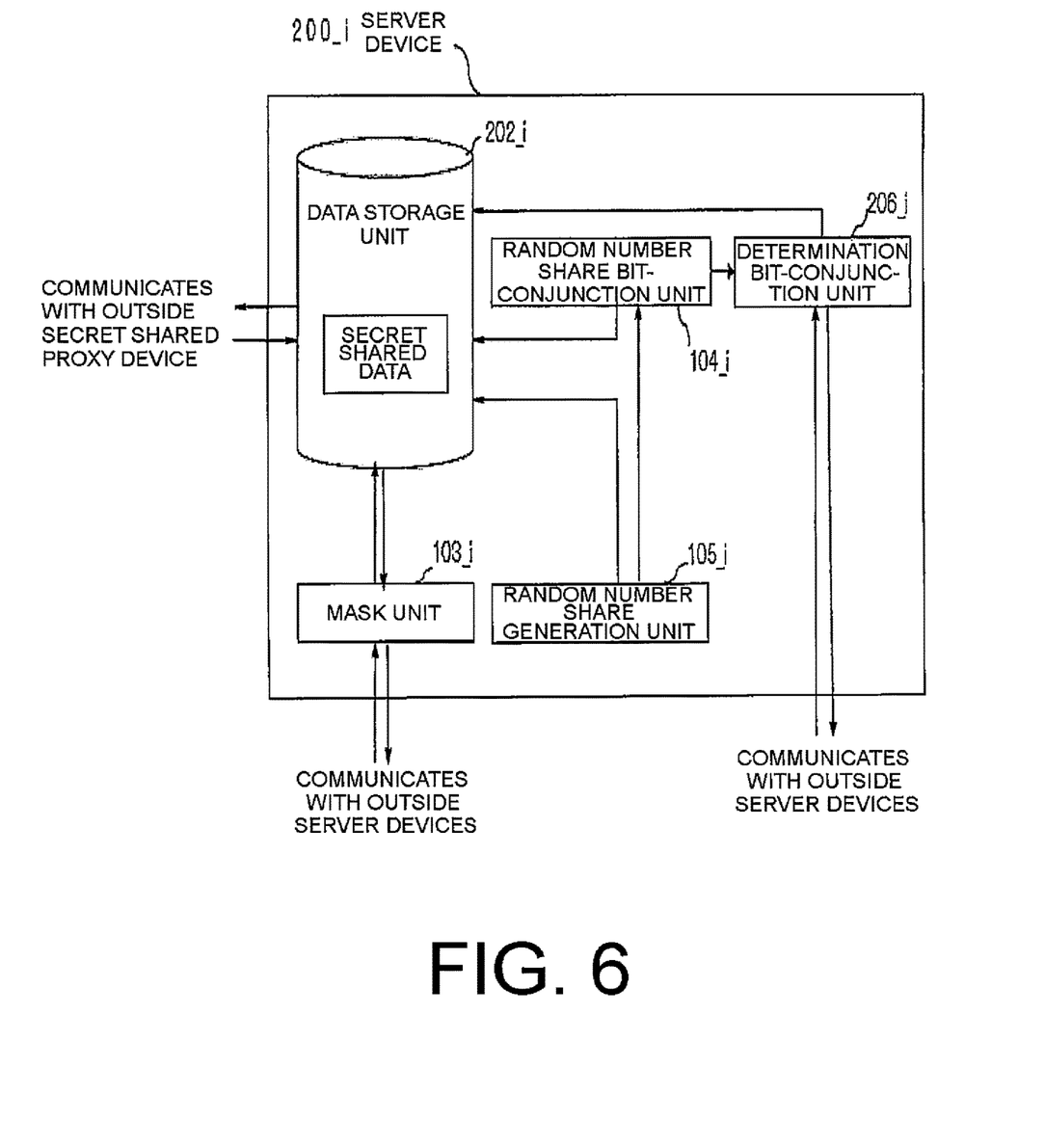
FIG. 6 is a block diagram for illustrating a functional configuration of a server device according to the second example embodiment of the present invention.

As shown in FIG. 6, an i-th server device 200_i ($1 \leq i \leq n$) comprises an i-th data storage unit 202_i, the i-th mask unit 103_i, the i-th random number share bit-conjunction unit 104_i, the i-th random number share generation unit 105_i, and an i-th determination bit-conjunction unit 206_i. The i-th data storage unit 202_i, the i-th mask unit 103_i, and the i-th determination bit-conjunction unit 206_i are communicably connected via the network to the server devices which are different from the server device including themselves, respectively.

In the secret equality determination system, the first through the n-th server devices 200_1 to 200_n, and the secret shared proxy device 210 according to the second example embodiment, for either values a and b supplied from an input device, which is not shown in the figure, to the secret shared proxy device 210 or secret shared data [a]R and [b]R stored in the first through the n-th data storage units 202_1 to 202_n, secret shared data of determined results indicative of whether or not a=b holds are computed without allowing the values a and b to be known from the input thereof and from values in computation processes, and are stored in the first through the n-th storage units 202_1 to 202_n, respectively. After being stored in the first through the n-th data storage units 2021 to 202_n, the above-mentioned secret shared data of the determined results may be delivered to the secret shared proxy device 210, respectively, to obtain restored results.

Figure 7:
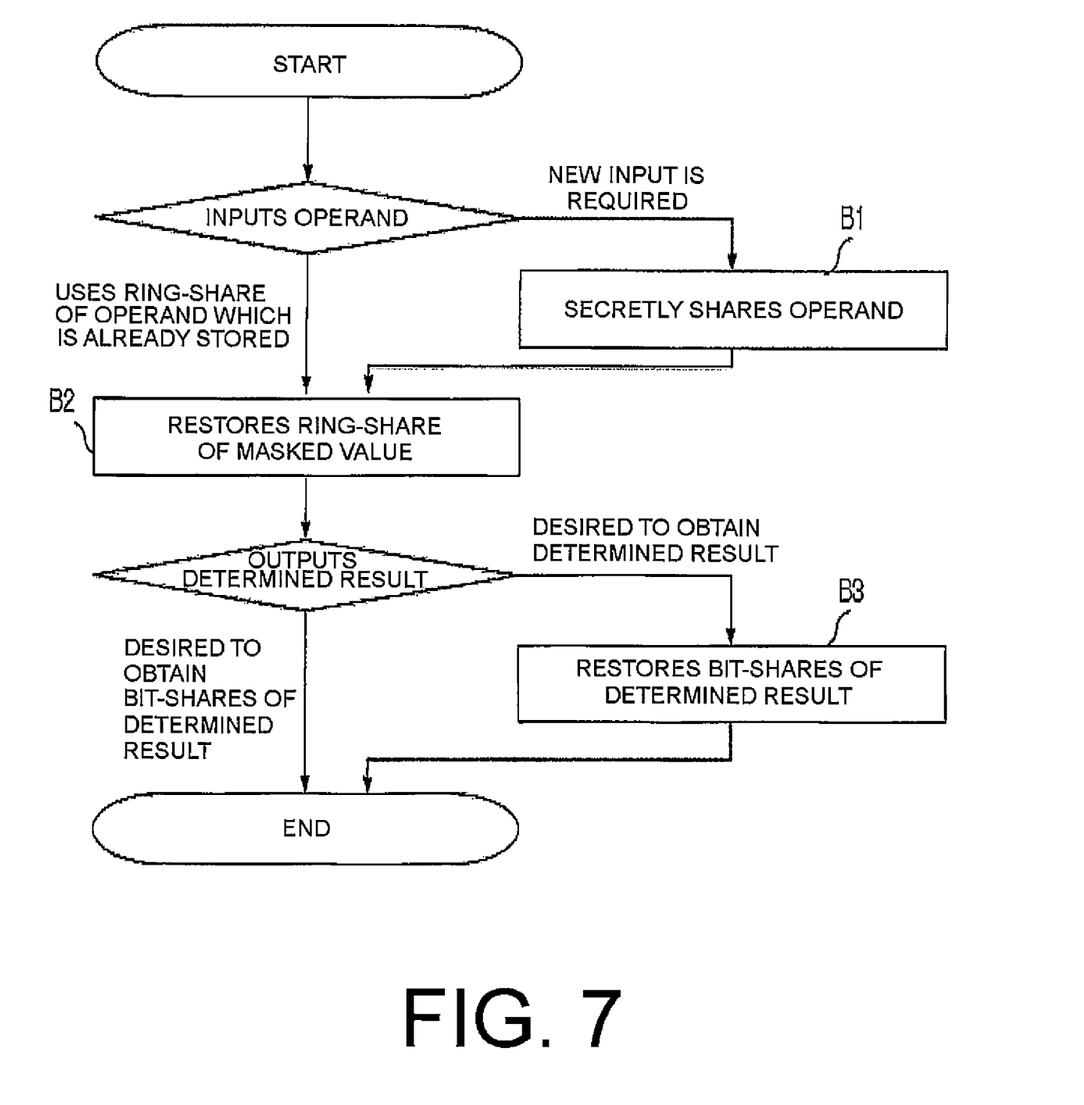
FIG. 7 is a flow chart for illustrating an example of operation of the secret shared proxy device according to the second example embodiment of the present invention.
Figure 8:
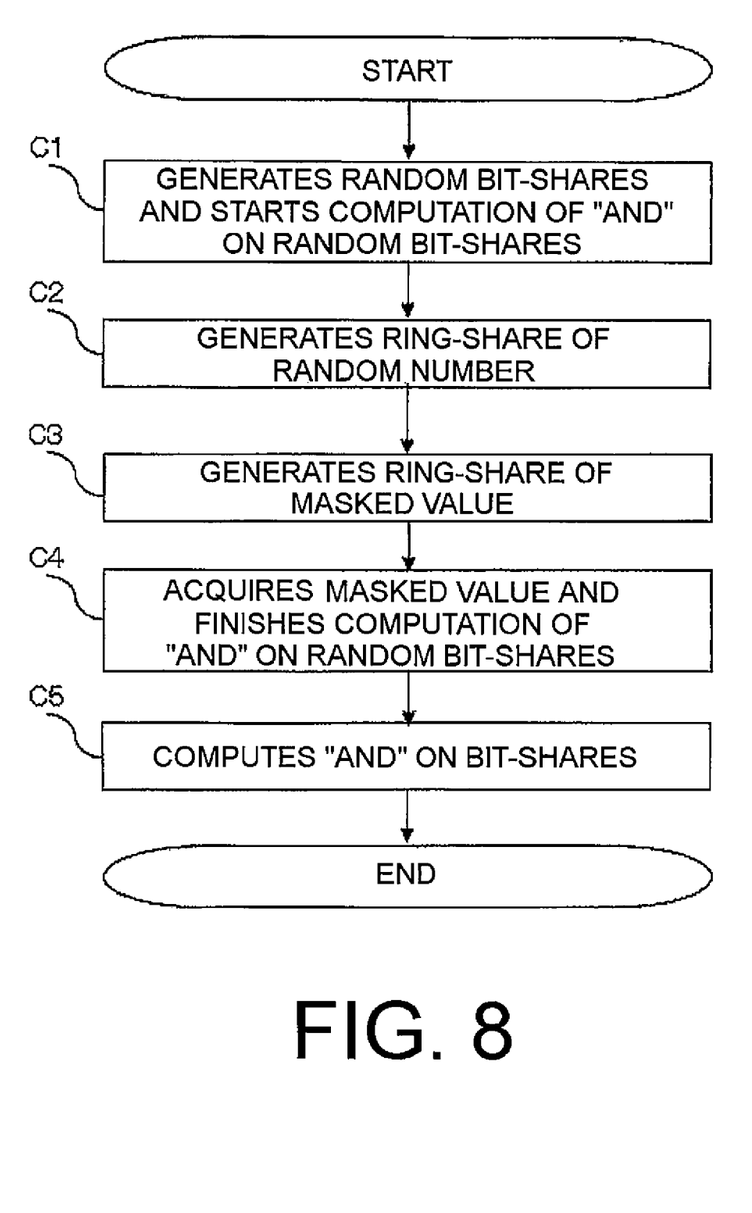
FIG. 8 is a flow chart for illustrating an example of operation of the server device according to the second example embodiment of the present invention

Now, operation of the secret equality determination system, the secret shared proxy device 210, and the i-th server device 200_i according to the second example embodiment of the present invention will be described in detail. FIG. 7 is a flow chart for illustrating an example of operation of the secret shared proxy device 210. FIG. 8 is a flowchart for illustrating an example of operation of the i-th server device 200_i.

(Step B1)

Referring now to FIG. 7, as an operation of the secret shared proxy device 210, first, an input device which is not shown in the figure delivers an input a to the secret shared data generation unit 211. The secret shared data generation unit 211 generates [a]_R. Next, the secret shared data generation unit 211 delivers [a]_Ri to the i-th data storage unit 202_i of the i-th server device 200_i on the outside. The i-th data storage unit 202_i stores [a]_Ri. For an input b also, the secret shared proxy device 210 and the i-th server device 200_i on the outside perform similar processes. The step B1 is a step which takes place only on starting computation. Accordingly, in a case where the secret equality determination is carried out about the ring-share which occurs during the processes of the secure computation protocol, the step B1 does not take place.

(Step C1)

Referring to FIG. 8, a step C1 is equivalent to the step A2 in the operation of the i-th server device 100_i according to the first example embodiment. However, the value is saved in the i-th data storage unit 202_i. The random number share bit-conjunction unit 104_i carries out computation of:

$$\bigwedge_{t=0}^{\ell-1} [r\_t]\_Bi \quad \text{[Math. 10]}$$

in parallel with computations in the steps C2, C3, B2, and C4. A circuit depth for executing the computation of Math. 10 is equal to Log (L). The i-th random number share bit-conjunction unit 104_i does not necessarily compute all of Log (L) stages and performs only a part of the computations which corresponds to the circuit depth required for the computations in the steps C2, C3, B2, and C4.

(Step C2)

A step C2 is equivalent to the step A3 in the operation of the i-th server device 100_i according to the first example embodiment. However, the value is saved in the i-th data storage unit 202_i.

(Step C3)

A step C3 is equivalent to the step A4 in the operation of the i-th server device 100_i according to the first example embodiment. However, the value is saved in the i-th data storage unit 202_i.

(Step B2)

Turning back to FIG. 7, the secret shared data restoration unit 212 fetches [a−b+r]_Ri from the i-th data storage unit 202_i of the i-th server device 200_i on the outside and restores a−b+r as restored data. The secret shared data restoration unit 212 delivers a−b+r to the i-th determination bit-conjunction unit 206_i.

(Step C4)

Turning to FIG. 8, the i-th determination bit-conjunction unit 206i acquires a−b+r from the secret shared data restoration unit 212.

(Step C5)

A step C5 is equivalent to the step A6 in the operation of the i-th server device 100_i according to the first example embodiment. However, the value is saved in the i-th data storage unit 202_i. In addition, the i-th determination bit-conjunction unit 206_i carries out the computation of [res]_Bi as modified in correspondence to the circuit depth required for the computations in the steps C2, C3, B2, and C4.

(Step B3)

Turning back to FIG. 7, in a case of obtaining a result of equality determination, the secret shared data restoration unit 212 fetches [res]_Bi from the i-th data storage unit 202_i and restores the result of equality determination.

The second example embodiment of the present invention described above has not only the first and the effects which are described in the first example embodiment but also a third effect which will be described in the following. However, the first effect is obtained in a case where Log (L) is not less than the total number of communication rounds in the steps C2. C3, B2, and C4. In a case where Log (L) is less than the total number of communication rounds in the steps C2, C3, B2, and C4, the number of communication rounds in the secret equality determination agrees with the total number of communication rounds in the steps C2, C3, B2, and C4. For instance, the first effect is obtained when the total number of communication rounds in the steps C2, C3, B2, and C4 is three and when L is not less eight.

A third effect is that the i-th server device 200_i is configured with less constituent modules. Specifically, as compared with the first server device 100_i according to the first example embodiment, the i-th server device 200_i is configured with constituent modules which are less in number by a part corresponding to the first secret shared data generation unit 101_i and the i-th secret shared data restoration unit 107_i. However, it is noted that the secret shared proxy device 210 is required.

It is noted that the secret equality determination method carried out by the above-mentioned secret equality determination system or the server device may be implemented by hardware, software, or a combination thereof. Herein, being implemented by the software means being implemented by reading and executing, by a computer, a secret equality determination program.

The secret equality determination program may be stored in various types of non-transitory computer readable media and may be supplied to the computer. The non-transitory computer readable media include various types of tangible storage media, Examples of the non-transitory computer readable media include a magnetic recording medium (e.g. a flexible disk, a magnetic tape, and a hard disk drive), a magneto-optical recording medium (e.g. a magneto-optical disc), a CD-ROM (Read Only Memory), a CD-R, a CD-R/W, and a semiconductor memory (e.g. a mask ROM, a PROM (Programmable ROM), an EPROM (Erasable PROM), a flash ROM, and a RAM (random access memory)). In addition, the secret equality determination program may be supplied to the computer by various types of transitory computer readable media. Examples of the transitory computer readable media include an electric signal, an optical signal, and an electromagnetic wave. The transitory computer readable medium can supply the secret equality determination program to the computer via a wire communication channel such as an electric wire or an optical fiber or a wireless communication channel.

While the present invention has been described with reference to the example embodiments thereof, the invention is not limited to these example embodiments. It will be understood by those ordinary skilled in the art that various changes in configuration and details may be made therein without departing from the scope of the present invention.

INDUSTRIAL APPLICABILITY

According to the present invention, it is possible to execute, for example, secret equality determination which takes place in character string processing in a database, without causing a difference in the number of rounds between a case of execution on a ring of the order of 2 and a case of execution on a ring of the order larger than 2, and to reduce the number of communication rounds. It is therefore possible to reduce the number of the communication rounds also with respect to an upper protocol using the secret equality determination. In addition, since the present invention does not depend on a method of secret sharing, it is possible to implement the present invention by a secure computation protocol with less communication traffic, such as in Non Patent Literature 2 or Non Patent Literature 5.

REFERENCE SIGNS LIST

100_i server device
101_i secret shared data generation unit

102_i data storage unit
103_i mask unit
104_i random number share bit-conjunction unit
105_i random number share generation unit
106_i determination bit-conjunction unit
107i secret shared data restoration unit
200_i server device
202_i data storage unit
206_i determination bit-conjunction unit
210 secret shared proxy device
211 secret shared data generation unit
212 secret shared data restoration unit

The invention claimed is:

1. A server device, comprising:
a secret shared data generation unit configured to generate first secret shared data;
a data storage unit configured to save the first secret shared data and second secret shared data generated by another server device;
a random number share generation unit configured to generate a random number share obtained by secretly sharing a random number and to store the random number share in the data storage unit;
a mask unit configured to mask the second secret shared data using the random number share and the first secret shared data which are saved in the data storage unit and to store masked data in the data storage unit;
a secret shared data restoration unit configured to transmit the masked data to the another server device and to restore original data from masked data acquired from the another server device to produce restored data;
a random number share bit-conjunction unit configured to perform, in parallel with other computations, computation of AND on values obtained by secretly sharing the random number to produce an ANDed value; and
a determination bit-conjunction unit configured to perform secret equality determination using the restored data, the random number share, and the ANDed value.

2. A secret equality determination system comprising a plurality of server devices, each being described in claim 1, which are connected via a network.

3. A secret equality determination method comprising:
generating first secret shared data;
saving, in a data storage unit, the first secret shared data and second secret shared data generated by another server device;
generating a random number share obtained by secretly sharing a random number and storing the random number share in the data storage unit;
masking the second secret shared data using the random number share and the first secret shared data which are saved in the data storage unit and storing masked data in the data storage unit;
transmitting the masked data to the another server device and restoring original data from masked data acquired from the another server device to produce restored data;
performing, in parallel with other computations, computation of AND on values obtained by secretly sharing the random number to produce an ANDed value; and
performing secret equality determination using the restored data, the random number share, and the ANDed value.

4. A non-transitory recording medium storing a secret equality determination program which causes a computer to execute:
a process of generating first secret shared data;
a process of saving, in a data storage unit, the first secret shared data and second secret shared data generated by another server device;
a process of generating a random number share obtained by secretly sharing a random number and storing the random number share in the data storage unit;
a process of masking the second secret shared data using the random number share and the first secret shared data which are saved in the data storage unit and storing masked data in the data storage unit;
a process of transmitting the masked data to the another server device and restoring original data from masked data acquired from the another server device to produce restored data;
a process of performing, in parallel with other computation, computation of AND on values obtained by secretly sharing the random number to produce an ANDed value; and
a process of performing secret equality determination using the restored data, the random number share, and the ANDed value.

\* \* \* \* \*